(12) United States Patent
Shimanaka et al.

(10) Patent No.: US 9,505,897 B2
(45) Date of Patent: Nov. 29, 2016

(54) TYRE, THE TREAD OF WHICH COMPRISES A HEAT-EXPANDABLE RUBBER COMPOSITION REDUCING NOISE DURING TRAVEL

(75) Inventors: Nanae Shimanaka, Kyoto (JP); Salvatore Pagano, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/122,401

(22) PCT Filed: May 31, 2012

(86) PCT No.: PCT/EP2012/060219
§ 371 (c)(1),
(2), (4) Date: Feb. 21, 2014

(87) PCT Pub. No.: WO2012/164002
PCT Pub. Date: Dec. 6, 2012

(65) Prior Publication Data
US 2014/0228459 A1    Aug. 14, 2014

(30) Foreign Application Priority Data
Jun. 1, 2011 (FR) ...................... 11 54800

(51) Int. Cl.
| | | |
|---|---|---|
| *B60C 1/00* | (2006.01) | |
| *B60C 11/14* | (2006.01) | |
| *C08K 5/21* | (2006.01) | |
| *C08K 5/23* | (2006.01) | |
| *C08J 9/06* | (2006.01) | |
| *C08K 5/24* | (2006.01) | |
| *C08K 5/28* | (2006.01) | |
| *C08L 9/06* | (2006.01) | |
| *C08L 21/00* | (2006.01) | |
| *C08J 9/00* | (2006.01) | |
| *C08J 9/10* | (2006.01) | |

(52) U.S. Cl.
CPC .............. *C08J 9/06* (2013.01); *B60C 1/0016* (2013.04); *C08J 9/0028* (2013.01); *C08J 9/0061* (2013.01); *C08J 9/0066* (2013.01); *C08J 9/103* (2013.01); *C08K 5/21* (2013.01); *C08K 5/23* (2013.01); *C08K 5/24* (2013.01); *C08K 5/28* (2013.01); *C08L 9/06* (2013.01); *C08L 21/00* (2013.01); *C08J 2309/06* (2013.01); *C08J 2409/00* (2013.01)

(58) Field of Classification Search
None
See application file for complete search history.

(56) References Cited

U.S. PATENT DOCUMENTS

| | | | |
|---|---|---|---|
| 3,414,528 A | 12/1968 | Hall | 260/2.5 |
| 3,879,321 A | 4/1975 | Shannon et al. | 260/23.7 |
| 5,147,477 A | 9/1992 | Mouri et al. | 152/209 R |
| 5,804,645 A | 9/1998 | Matsuo | 524/575 |
| 5,977,238 A | 11/1999 | Labauze | 524/492 |
| 6,013,718 A | 1/2000 | Cabioch et al. | 524/506 |
| 6,127,472 A * | 10/2000 | Kobayashi et al. | 524/492 |
| 6,135,180 A | 10/2000 | Nohara | 152/209.1 |
| 6,336,487 B1 | 1/2002 | Teratani et al. | 152/209.7 |
| 6,427,738 B1 * | 8/2002 | Fujino et al. | 152/209.4 |
| 6,497,261 B1 * | 12/2002 | Fukushima et al. | 152/209.4 |
| 6,503,973 B2 | 1/2003 | Robert et al. | 524/492 |
| 6,730,710 B2 | 5/2004 | Mori et al. | 521/54 |
| 6,774,255 B1 | 8/2004 | Tardivat et al. | 556/427 |
| 6,815,473 B2 | 11/2004 | Robert et al. | 523/215 |
| 6,849,754 B2 | 2/2005 | Deschler et al. | 556/427 |
| 7,199,175 B2 | 4/2007 | Vasseur | 524/492 |
| 7,217,751 B2 | 5/2007 | Durel et al. | 524/262 |
| 7,300,970 B2 | 11/2007 | Durel et al. | 524/493 |
| 7,335,692 B2 | 2/2008 | Vasseur et al. | 524/312 |
| 7,488,768 B2 | 2/2009 | Tardivat et al. | 524/262 |
| 7,491,767 B2 | 2/2009 | Durel et al. | 524/493 |
| 7,820,771 B2 | 10/2010 | Lapra et al. | 525/479 |
| 7,825,183 B2 | 11/2010 | Robert et al. | 524/476 |
| 7,834,074 B2 | 11/2010 | Brunelet et al. | 524/318 |

(Continued)

FOREIGN PATENT DOCUMENTS

| | | | |
|---|---|---|---|
| EP | 0 599 643 A1 | 6/1994 | |
| EP | 0 826 522 A1 | 3/1998 | |

(Continued)

OTHER PUBLICATIONS

Oxalic Acid MSDS, pp. 1-6, Mar. 28, 2011, obtained online from: http://dept.harpercollege.edu/chemistry/msds/Oxalic%20dihydrate20%JTBaker.pdf.

(Continued)

*Primary Examiner* — Kara Boyle
(74) *Attorney, Agent, or Firm* — Fitzpatrick, Cella, Harper & Scinto

(57) ABSTRACT

A vehicle tire includes a tread formed of a heat-expandable rubber composition when in an unvulcanized state. The composition includes: from 50 to 100 phr of a copolymer based on styrene and butadiene; optionally from 0 to 50 phr of another diene elastomer, such as a polybutadiene or natural rubber; more than 50 phr of a reinforcing filler, such as silica and/or carbon black; between 5 and 25 phr of a blowing agent, such as an azodicarbonamide compound; and between 5 and 25 phr of a heat-fusible compound having a melting point between 70° C. and 150° C., such as urea or a heat-fusible urea derivative. A total content of the blowing agent and the heat-fusible compound is greater than 15 phr. Use of the composition enables, after the tire is vulcanized, a significant reduction in noise emitted by the tire during running.

20 Claims, No Drawings

(56) References Cited

U.S. PATENT DOCUMENTS

| | | |
|---|---|---|
| 7,882,874 B2 | 2/2011 | Robert et al. ............ 152/209.1 |
| 7,900,667 B2 | 3/2011 | Vasseur .................... 152/209.1 |
| 8,324,310 B2 | 12/2012 | Robert et al. ............... 524/518 |
| 8,492,475 B2 | 7/2013 | Araujo Da Silva et al. . 524/552 |
| 8,499,805 B2 | 8/2013 | Maesaka et al. .......... 152/209.1 |
| 2001/0025162 A1 | 9/2001 | Roe et al. ................... 604/364 |
| 2003/0119927 A1 | 6/2003 | Mori et al. .................... 521/50 |
| 2004/0067380 A1 | 4/2004 | Maeda et al. ................ 428/500 |
| 2006/0089445 A1 | 4/2006 | Gandon-Pain ............... 524/492 |
| 2007/0032593 A1 | 2/2007 | Yagi et al. ................. 524/575.5 |
| 2007/0219320 A1 | 9/2007 | Ichino et al. ................. 525/191 |
| 2008/0319125 A1 | 12/2008 | Boswell et al. .............. 524/543 |
| 2009/0071584 A1 | 3/2009 | Zhang et al. .............. 152/209.5 |
| 2009/0186961 A1 | 7/2009 | Araujo Da Silva et al. . 523/150 |
| 2009/0209709 A1 | 8/2009 | Araujo Da Silva et al. ......................... 525/333.1 |
| 2009/0234066 A1 | 9/2009 | Araujo Da Silva et al. . 524/571 |
| 2009/0270558 A1 | 10/2009 | Gandon-Pain et al. ...... 525/190 |
| 2009/0308513 A1 | 12/2009 | Ota ............................ 152/209.5 |
| 2009/0309513 A1 | 12/2009 | Bergman et al. ............ 315/291 |
| 2010/0022714 A1 | 1/2010 | Varagniat et al. ........... 525/209 |
| 2010/0132861 A1 | 6/2010 | Sandstrom et al. ....... 152/209.1 |
| 2010/0216935 A1 | 8/2010 | Boswell et al. .............. 524/543 |
| 2010/0256275 A1 | 10/2010 | Lopitaux ...................... 524/285 |
| 2011/0021702 A1 | 1/2011 | Gandon-Pain et al. ........ 525/55 |
| 2011/0259498 A1 | 10/2011 | Pagano et al. ................ 152/450 |
| 2011/0319646 A1 | 12/2011 | Boswell et al. .............. 556/428 |
| 2012/0208948 A1 | 8/2012 | Gandon-Pain et al. ...... 524/521 |
| 2012/0247637 A1 | 10/2012 | Tanaka et al. ................ 152/450 |
| 2012/0252915 A1 | 10/2012 | Maesaka et al. ............... 521/95 |
| 2013/0153107 A1 | 6/2013 | Shimanaka et al. .......... 152/535 |
| 2013/0153108 A1 | 6/2013 | Tanaka et al. ................ 152/537 |
| 2013/0153109 A1 | 6/2013 | Shimanaka et al. .......... 152/537 |

FOREIGN PATENT DOCUMENTS

| | | |
|---|---|---|
| EP | 0 940 435 A1 | 9/1999 |
| EP | 0 969 040 A1 | 1/2000 |
| EP | 1 052 270 A1 | 11/2000 |
| EP | 1 505 112 A1 | 2/2005 |
| EP | 2 039 531 A1 | 3/2009 |
| EP | 2 042 549 A1 | 4/2009 |
| FR | 1 475 141 | 3/1967 |
| FR | 2 952 645 A1 | 5/2011 |
| JP | 3-159803 | 7/1991 |
| JP | 8-268006 A | 10/1996 |
| JP | 2001-287508 A | 10/2001 |
| JP | 2002-60548 A | 2/2002 |
| JP | 2002-211203 A | 7/2002 |
| JP | 2003-183434 A | 7/2003 |
| JP | 2004-91747 A | 3/2004 |
| JP | 2006-299031 A | 11/2006 |
| JP | 2007-039499 A | 2/2007 |
| JP | 2007-314683 A | 12/2007 |
| JP | 2008-001826 | 1/2008 |
| JP | 2008-150413 A | 7/2008 |
| WO | 97/36724 A2 | 10/1997 |
| WO | 99/09036 | 2/1999 |
| WO | 99/16600 | 4/1999 |
| WO | 02/10269 A2 | 2/2002 |
| WO | 02/30939 A1 | 4/2002 |
| WO | 02/31041 A1 | 4/2002 |
| WO | 02/082782 A1 | 10/2002 |
| WO | 02/088238 A1 | 11/2002 |
| WO | 03/002648 A1 | 1/2003 |
| WO | 03/002649 A1 | 1/2003 |
| WO | 2005/087859 A1 | 9/2005 |
| WO | 2006/023815 A2 | 3/2006 |
| WO | 2006/061064 A1 | 6/2006 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2007/017060 A1 | 2/2007 |
| WO | 2007/061550 A1 | 5/2007 |
| WO | 2007/098080 A2 | 8/2007 |
| WO | 2008/003434 A1 | 1/2008 |
| WO | 2008/003435 A1 | 1/2008 |
| WO | 2008/080750 A1 | 7/2008 |
| WO | 2008/080751 A1 | 7/2008 |
| WO | 2009/083125 A1 | 7/2009 |
| WO | 2009/112220 A1 | 9/2009 |
| WO | 2010-009850 A1 | 1/2010 |
| WO | 2010/069510 A1 | 6/2010 |
| WO | 2011/051203 A1 | 5/2011 |
| WO | 2011/064128 | 6/2011 |

OTHER PUBLICATIONS

Salicylic Acid MSDS, pp. 1-6, Oct. 10, 2005, obtained online from http://www.sciencelab.com/msds.php?msdsld=9927249.

Stearic Acid MSDS, Fisher Scientific, Dec. 12, 1997, pp. 1-4, obtained online from: http://www.westliberty.edu/health-and-safety/files/2012/08/Stearic-Acid.pdf.

Phthalic Acid MSDS, pp. 1-5, no publication date given, obtained online from http://www.sciencelab.com/msds.php?msdsld =9926545.

Drug Bank—Stearic Acid pp. 1-8, no publication date given, obtained online from http://www.drugbank.ca/drugs/DB03193.

Table of Acids With Ka and pKA Values, pp. 1-2, no publication date given , obtained online from: http://clas.sa.ucsb.edu/staff/Resource%20Folder/Chem109ABC/Acid,%20Base%20Strength/Table%20of%20Acids%20w%20Kas%20and%20pKas.pdf.

Drug Bank—Salicylic Acid, pp. 1-3, no publication date given, obtained online from: http://www.drugbank.ca/drugs/DB00936.

Hexamoll Dinch Technical Data Sheet, pp. 1-2, BASF, Houston Texas, 2013, obtained online from: http/www2.basf.us/plasticizers/pdfs/products/TDS_DINCH.pdf.

U.S. Appl. No. 14/122,409, filed May 31, 2012.

U.S. Appl. No. 14/122,394, filed May 31, 2012.

Rubber Technology Compounding and Testing for Performance, J.S. Dick, ed., Hanser Publishers, Munich, 2d edition (2009).

\* cited by examiner

TYRE, THE TREAD OF WHICH COMPRISES A HEAT-EXPANDABLE RUBBER COMPOSITION REDUCING NOISE DURING TRAVEL

1. FIELD OF THE INVENTION

The invention relates to tyres for motor vehicles and to the rubber compositions which can be used for the manufacture of such tyres.

It relates more particularly to tyres, the tread of which comprises a foam rubber composition, in the vulcanized state, intended to reduce the noise emitted by these tyres during the running of the vehicles

2. STATE OF THE ART

It is known (see, for example, Patent Application WO 2010/069510) that the noise emitted by a tyre when running originates, inter alia, from the vibrations of its structure resulting from the contact of the tyre with the irregularities of the roadway, also bringing about generation of various sound waves. Everything is ultimately manifested in the form of noise, both inside and outside the vehicle. The amplitude of these various manifestations depends on the modes of vibration specific to the tyre and also on the nature of the surface on which the vehicle is moving. The range of frequencies corresponding to the noise generated by the tyres typically extends from 20 to 4000 Hz approximately.

As regards the noise noticed inside the vehicle, two methods of propagation of the sound coexist:
  the vibrations are transmitted via the wheel centre, the suspension system and the transmission in order to finally generate noise in the passenger compartment; reference is then made to "structure-borne transmission", which is generally dominant for low frequencies of the spectrum (up to approximately 400 Hz);
  the sound waves emitted by the tyre are directly propagated by the aerial route within the vehicle, the latter acting as filter; reference is then made to "aerial transmission", which generally dominates in the high frequencies (approximately 600 Hz and above).

The noise referred to as "road noise" instead describes the overall level of noise noticed in the vehicle and within a frequency range extending up to 2000 Hz. The noise referred to as "cavity noise" describes the nuisance due to the resonance of the inflation cavity of the casing of the tyre.

As regards the noise emitted outside the vehicle, the various interactions between the tyre and the road surface, and the tyre and the air, which will be a nuisance for the occupants of the vehicle when the latter rolls over a roadway, are relevant. In this case, several sources of noise, such as the noise referred to as "indentation noise", due to the impact of the rough patches of the road in the contact area, the noise referred to as "friction noise", essentially generated on exiting the contact area, and the noise referred to as "pattern noise", due to the arrangement of the pattern elements and to the resonance in the various grooves, are distinguished. The range of frequencies concerned typically corresponds here to a range extending from 300 to 3000 Hz approximately.

3. BRIEF DESCRIPTION OF THE INVENTION

In point of fact, the Applicant Companies have discovered, during their research studies, a specific rubber composition which, incorporated in the tread of the tyres, has improved sound barrier properties within a frequency range located between 30 and 2000 Hz and is thus capable of contributing to reducing the noise emitted both inside and outside the vehicles during the running of their tyres.

Consequently, the present invention relates to a tyre, the tread of which comprises, in the non-vulcanized state, a heat-expandable rubber composition comprising at least:
  from 50 to 100 phr of a copolymer based on styrene and butadiene;
  optionally from 0 to 50 phr of another diene elastomer;
  more than 50 phr of a reinforcing filler;
  between 5 and 25 phr of a blowing agent;
  between 5 and 25 phr of a heat-fusible compound, the melting point of which is between 70° C. and 150° C.;
  the total content of blowing agent and heat-fusible compound being greater than 15 phr.

The invention also relates to a tyre, in the vulcanized state, obtained after curing (vulcanizing) the raw tyre in accordance with the invention as described above.

The tyres of the invention are particularly intended to equip motor vehicles of passenger type, including 4×4 (four-wheel drive) vehicles and SUV (Sport Utility Vehicles) vehicles, two-wheel vehicles (in particular motorcycles), and also industrial vehicles chosen in particular from vans and heavy-duty vehicles (i.e., underground trains, buses and heavy road transport vehicles, such as lorries or tractors).

The invention and its advantages will be readily understood in the light of the description and the implementational examples which follow.

4. DETAILED DESCRIPTION OF THE INVENTION

In the present description, unless expressly indicated otherwise, all the percentages (%) shown are percentages by weight.

"Diene" elastomer (or, without distinction, rubber) is understood to mean an elastomer resulting at least in part (that is to say, a homopolymer or a copolymer) from diene monomer(s) (i.e., monomers carrying two conjugated or non-conjugated carbon-carbon double bonds). "Isoprene elastomer" is understood to mean an isoprene homopolymer or copolymer, in other words a diene elastomer selected from the group consisting of natural rubber (NR), synthetic polyisoprenes (IRs), various isoprene copolymers and the mixtures of these elastomers.

The abbreviation "phr" means parts by weight per hundred parts of elastomer (of the total of the elastomers, if several elastomers are present).

Furthermore, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The tyre of the invention thus has the essential characteristic that its tread, in the non-vulcanized state, at the very least for its portion (radially outermost part) intended to come directly into contact with the surface of the road, comprises a heat-expandable rubber composition comprising at least:
  from 50 to 100 phr of a (at least one, that is to say one or more) copolymer based on styrene and butadiene;
  optionally from 0 to 50 phr of a (at least one, that is to say one or more) other diene elastomer;

more than 50 phr of a (at least one, that is to say one or more) reinforcing filler;

between 5 and 25 phr of a (at least one, that is to say one or more) blowing agent;

between 5 and 25 phr of a (at least one, that is to say one or more) heat-fusible compound, the melting point of which is between 70° C. and 150° C.;

the total content of blowing agent and heat-fusible compound being greater than 15 phr.

The various components above are described in detail below.

4.1. Copolymer Based on Styrene and Butadiene

The first essential characteristic of the heat-expandable rubber composition is to comprise from 50 to 100 phr of a copolymer based on styrene and butadiene, that is to say of a to copolymer of at least one styrene monomer and of at least one butadiene monomer; in other words, the said copolymer based on styrene and butadiene comprises, by definition, at least units resulting from styrene and units resulting from butadiene.

Preferably, the content of the said copolymer in the heat-expandable rubber composition is within a range from 50 to 90 phr, more preferably within a range from 60 to 85 phr.

The following are suitable in particular as butadiene monomers: 1,3-butadiene, 2-methyl-1,3-butadiene, 2,3-di ($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, or an aryl-1,3-butadiene. The following are suitable in particular as styrene monomers: styrene, methylstyrenes, para(tert-butyl)styrene, methoxystyrenes or chlorostyrenes.

The said copolymer based on styrene and butadiene can have any microstructure, which depends on the polymerization conditions used, in particular on the presence or absence of a modifying and/or randomizing agent and on the amounts of modifying and/or randomizing agent employed. It can, for example, be a block, random, sequential or microsequential copolymer and can be prepared in dispersion or in solution; it can be coupled and/or star-branched or else functionalized with a coupling and/or star-branching or functionalization agent.

Preferably, the copolymer based on styrene and butadiene is selected from the group consisting of styrene/butadiene copolymers (abbreviated to SBRs), styrene/butadiene/isoprene copolymers (abbreviated to SBIRs) and the mixtures of such copolymers.

Mention may in particular be made, among the SBIR copolymers, of those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2- plus 3,4-units of the isoprene part of between 5% and 70% and a content (mol %) of trans-1,4-units of the isoprene part of between 10% and 50%.

More preferably, an SBR copolymer is used. Mention may in particular be made, among the SBR copolymers, of those having a styrene content of between 5% and 60% by weight and more particularly between 20% and 50%, a content (mol %) of 1,2-bonds of the butadiene part of between 4% and 75%, and a content (mol %) of trans-1,4-bonds of between 10% and 80%.

The Tg of the copolymer based on styrene and butadiene is preferably greater than −40° C., more preferably greater than −35° C. and in particular between −30° C. and +30° C. (more particularly within a range from −25° C. to +25° C.).

The Tg of the elastomers described here is measured in a conventional way well known to a person skilled in the art on an elastomer in the dry state (i.e., without extending oil) and by DSC (for example according to ASTM D3418-1999).

A person skilled in the art knows how to modify the microstructure of a copolymer based on styrene and butadiene, in particular of an SBR, in order to increase and adjust its Tg, in particular by varying the contents of styrene, of 1,2-bonds or also of trans-1,4-bonds of the butadiene part. Use is more preferably made of an SBR (solution or emulsion) having a styrene content (mol %) which is greater than 35%, more preferably between 35% and 60%, in particular within a range from 38% to 50%. SBRs having a high Tg are well known to a person skilled in the art; they have been used essentially in tyre treads in order to improve some of their wear properties.

The above copolymer based on styrene and butadiene can be combined with at least one other (also referred to as second) diene elastomer, other than the said copolymer (that is to say, not comprising units resulting from styrene and butadiene), the said second diene elastomer being present at a content by weight which is consequently at most equal to 50 phr.

This optional second diene elastomer is preferably selected from the group consisting of natural rubbers (NRs), synthetic polyisoprenes (IRs), polybutadienes (BRs), isoprene copolymers and the blends of these elastomers. Such copolymers are more preferably selected from the group consisting of isoprene/butadiene copolymers (BIRs) and isoprene/styrene copolymers (SIRs).

Among the latter, polybutadiene homopolymers (BRs), in particular those having a content (mol %) of 1,2-units of between 4% and 80% or those having a cis-1,4-content (mol %) of greater than 80%; polyisoprene homopolymers (IRs); butadiene/isoprene copolymers (BIRs), in particular those having an isoprene content of between 5% and 90% by weight and a Tg of from −40° C. to −80° C.; isoprene/styrene copolymers (SIRs), in particular those having a styrene content of between 5% and 50% by weight and a Tg of between −25° C. and −50° C., are suitable in particular.

According to a preferred embodiment, the second diene elastomer is an isoprene elastomer, more preferably natural rubber or a synthetic polyisoprene of the cis-1,4-type; use is preferably made, among these synthetic polyisoprenes, of polyisoprenes having a content (mol %) of cis-1,4-bonds of greater than 90%, more preferably still of greater than 98%.

According to another preferred embodiment, the second diene elastomer is a polybutadiene, preferably a polybutadiene having a content of cis-1,4-bonds of greater than 90%.

According to another preferred embodiment, the second diene elastomer is a mixture of polybutadiene with an isoprene elastomer (natural rubber or synthetic polyisoprene).

More preferably, the content of second diene elastomer, in particular of polybutadiene and/or isoprene elastomer (in particular natural rubber), is within a range from 10 to 50 phr, more preferably still within a range from 15 to 40 phr.

The diene elastomers described above might also be combined, in a predominant amount, with synthetic elastomers other than diene elastomers, indeed even polymers other than elastomers, for example thermoplastic polymers.

4.2. Filler

Use may be made of any filler known for its capabilities in reinforcing a rubber composition, for example an organic filler, such as carbon black, or else an inorganic filler, such as silica, with which is combined, in a known way, a coupling agent.

Such a filler preferably consists of nanoparticles, the (weight-)average size of which is less than a micrometre, generally less than 500 nm, most often between 20 and 200 nm, in particular and more preferably between 20 and 150 nm.

Preferably, the content of total reinforcing filler (especially silica or carbon black or a mixture of silica and carbon black) is between 50 and 150 phr. A content of greater than 50 phr promotes good mechanical strength; beyond 150 phr, there exists a risk of excessive stiffness of the rubber composition. For these reasons, the content of total reinforcing filler is more preferably within a range from 70 to 120 phr.

Suitable as carbon blacks are, for example, all carbon blacks which are conventionally used in tyres ("tyre-grade" blacks), such as carbon blacks of the 100, 200 or 300 series (ASTM grades), such as, for example, the N115, N134, N234, N326, N330, N339, N347 or N375 blacks. The carbon blacks might, for example, be already incorporated in the diene elastomer, in particular isoprene elastomer, in the form of a masterbatch (see, for example, Application WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

"Reinforcing inorganic filler" should be understood here as meaning any inorganic or mineral filler, whatever its colour and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

Mineral fillers of the siliceous type, especially silica ($SiO_2$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$, in particular between 60 and 300 $m^2/g$. Mention will be made, as highly dispersible precipitated silicas (HDSs), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG or the Zeopol 8715, 8745 and 8755 silicas from Huber.

According to another particularly preferred embodiment, use is made, as predominant filler, of a reinforcing inorganic filler, in particular silica, at a content within a range from 70 to 120 phr, to which reinforcing inorganic filler can advantageously be added carbon black at a minor content at most equal to 15 phr, in particular within a range from 1 to 10 phr.

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer. Use is made in particular of at least bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Particularly suitable, without the definition below being limiting, are silane polysulphides corresponding to the following general formula (I):

$$Z\text{-}A\text{-}S_x\text{-}A\text{-}Z, \text{ in which:} \qquad (I)$$

x is an integer from 2 to 8 (preferably from 2 to 5);

the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene);

the Z symbols, which are identical or different, correspond to one of the three formulae below:

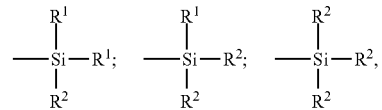

in which:

the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl);

the $R^2$, radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is made in particular, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in the abovementioned Patent Application WO 02/083782 (or U.S. Pat. No. 7,217,751).

Mention will in particular be made, as examples of coupling agents other than an alkoxysilane polysulphide, of bifunctional POSs (polyorganosiloxanes), or else of hydroxysilane polysulphides ($R^2$=OH in the above formula I), such as described, for example, in Patent Applications WO 02/30939 (or U.S. Pat. No. 6,774,255), WO 02/31041 (or US 2004/051210) and WO 2007/061550, or else of silanes or POSs bearing azodicarbonyl functional groups, such as described, for example, in Patent Applications WO 2006/125532, WO 2006/125533 and WO 2006/125534.

Mention will be made, as examples of other silane sulphides, for example, of silanes bearing at least one thiol (—SH) function (referred to as mercaptosilanes) and/or at least one masked thiol function, such as described, for example, in patents or patent applications U.S. Pat. No. 6,849,754, WO 99/09036, WO 2006/023815 and WO 2007/098080.

Of course, use might also be made of mixtures of the coupling agents described above, as described in particular in the abovementioned Application WO 2006/125534.

When they are reinforced with an inorganic filler, such as silica, the rubber compositions preferably comprise between 2 and 15 phr, more preferably between 3 and 12 phr, of coupling agent.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

4.3. Blowing Agent and Associated Heat-Fusible Compound

In a well-known way, a blowing agent is a compound which can decompose thermally and which is intended to release, during thermal activation, for example during the vulcanization of the tyre, a large amount of gas and to thus result in the formation of bubbles. The release of gas in the rubber composition thus originates from this thermal decomposition of the blowing agent. In the majority of cases, the gas formed is nitrogen but it also happens, according to the nature of the blowing agent used, that this gas comprises carbon dioxide.

There exists physical or chemical blowing agents of endothermic or exothermic type. Use is preferably made of chemical blowing agents, more preferably chemical blowing agents of the exothermic type.

Mention will in particular be made, among the blowing agents which can preferably be used, of those selected from the group consisting of azo, nitroso, hydrazine, carbazide, semicarbazide, tetrazole, carbonate and citrate compounds and the mixtures of such compounds.

These blowing agents are more preferably selected from the group consisting of diazo, dinitroso, sulphonyl semicarbazide and sulphonyl hydrazide compounds and the mixtures of such compounds. Mention may more particularly be made, among these compounds, of dinitroso pentamethylene tetramine, dinitroso pentastyrene tetramine, azodicarbonamide, N,N'-dimethyl-N,N'-dinitrosophthalamide, benzenesulphonyl hydrazide, toluenesulphonyl hydrazide, p,p'-oxybis(benzenesulphonyl)hydrazide, p-toluenesulphonyl semicarbazide or p,p'-oxybis(benzenesulphonyl)semicarbazide; in these examples, the gas formed is composed of a mixture of nitrogen and carbon dioxide.

Mention may be made, among the blowing agents giving off only carbon dioxide, for example, of the following compounds: alkali metal or alkaline earth metal carbonates and bicarbonates, such as sodium carbonate or sodium bicarbonate, ammonium carbonate or ammonium bicarbonate, citrates, such as sodium monocitrate, malonic acid or citric acid.

Preferably, the content of blowing agent is between 8 and 20 phr.

An essential characteristic of the invention is to add, to the blowing agent described above, a heat-fusible compound, the melting point of which is between 70° C. and 150° C., preferably between 100° C. and 150° C., more preferably between 110° C. and 140° C. The melting point is a well-known basic physical constant (available, for example, in "*Handbook of Chemistry and Physics*") of organic or inorganic heat-fusible compounds; it can be monitored by any known means, for example by the Thiele method, the Köfler bench method or also by DSC analysis.

The content of this heat-fusible compound is preferably between 8 and 20 phr. Its role is to be converted into liquid within the specific temperature range indicated above, before or at the moment when the blowing agent decomposes thermally and releases gas bubbles.

Any compound exhibiting a melting point of between 70° C. and 150° C., preferably between 100° C. and 150° C., more preferably between 110° C. and 140° C., is capable of being suitable. Use may in particular be made of the rubber additives known to a person skilled in the art as being compatible, both in their form (for example in the powder form) and in their chemical nature, with normal rubber compositions for tyres.

Mention may in particular be made, by way of example, of thermoplastic polymers, such as polyethylene or polypropylene.

Mention may also be made, as examples, of thermoplastic hydrocarbon resins having a high glass transition temperature (Tg), the melting point of which (or that which is here regarded as equivalent, the softening point of which, for example measured according to the known ring and ball method—Standard ISO 4625) is between 70° C. and 150° C., preferably between 100° C. and 150° C., more preferably between 110° C. and 140° C.

The name "resin" is reserved, in the present patent application, by definition known to a person skilled in the art, for a compound which is solid at ambient temperature (23° C.), in contrast to a liquid plasticizing compound, such as an oil.

These hydrocarbon resins are polymers well known to a person skilled in the art, essentially based on carbon and hydrogen, which can be used in particular as plasticizing agents or tackifying agents in polymer matrices. They can be aliphatic, cycloaliphatic, aromatic or hydrogenated aromatic, of the aliphatic/aromatic type, that is to say based on aliphatic and/or aromatic monomers. They can be natural or synthetic, based or not based on petroleum (if such is the case, also known under the name of petroleum resins). Such thermoplastic hydrocarbon resins can be selected, for example, from the group consisting of cyclopentadiene homopolymer or copolymer resins, dicyclopentadiene homopolymer or copolymer resins, terpene homopolymer or copolymer resins, terpene/phenol homopolymer or copolymer resins, C5 fraction homopolymer or copolymer resins, C9 fraction homopolymer or copolymer resins, α-methylstyrene homopolymer or copolymer resins and the mixtures of these resins.

According to a particularly preferred embodiment, the heat-fusible compound chosen is urea or a heat-fusible urea derivative. Urea in particular has a melting point which is well suited to the application targeted.

An essential characteristic of the invention, for the targeted reduction in the running noise, is that the total amount of blowing agent and of heat-fusible compound is greater than 15 phr, preferably between 15 and 40 phr. This total amount is more preferably greater than 20 phr, in particular between 20 and 40 phr, more particularly between 20 and 35 phr.

4.4. Various Additives

The heat-expandable rubber composition can also comprise all or some of the usual additives generally used in rubber compositions for tyre treads, such as, for example, protection agents, such as anti-ozone waxes, chemical antiozonants or antioxidants, plasticizing agents, a crosslinking system based either on sulphur or on sulphur donors and/or on peroxide and/or on bismaleimides, vulcanization accelerators or vulcanization activators.

According to a preferred embodiment, the heat-expandable rubber composition also comprises a liquid plasticizing agent (liquid at 20° C.), the role of which is to soften the matrix by diluting the diene elastomer and the reinforcing filler; its Tg (glass transition temperature) is, by definition, less than −20° C., preferably less than −40° C.

More preferably, for optimum performance of the tread of the tyre of the invention, this liquid plasticizer is used at a relatively small content, such that the ratio by weight of reinforcing filler to liquid plasticizing agent is greater than 2.0, more preferably greater than 2.5, in particular greater than 3.0.

Any extending oil, whether of aromatic or non-aromatic nature, any liquid plasticizing agent known for its plasticizing properties with regard to diene elastomers, can be used. At ambient temperature (20° C.), these plasticizers or these oils, which are more or less viscous, are liquids (that is to say, as a reminder, substances which have the ability to eventually assume the shape of their container), in contrast in particular to plasticizing hydrocarbon resins, which are by nature solids at ambient temperature.

Liquid plasticizers selected from the group consisting of naphthenic oils (low- or high-viscosity, in particular hydrogenated or non-hydrogenated), paraffinic oils, MES (Medium Extracted Solvates) oils, DAE (Distillate Aromatic Extracts) oils, TDAE (Treated Distillate Aromatic Extracts) oils, RAE (Residual Aromatic Extracts) oils, TRAE (Treated Residual Aromatic Extracts) oils, SRAE (Safety Residual Aromatic Extracts) oils, mineral oils, vegetable oils, ether plasticizers, ester plasticizers, phosphate plasticizers, sulphonate plasticizers and the mixtures of these compounds are particularly suitable. According to a more preferred embodiment, the liquid plasticizing agent is selected from the group consisting of MES oils, TDAE oils, naphthenic oils, vegetable oils and the mixtures of these oils.

Mention may be made, as phosphate plasticizers, for example, of those which comprise between 12 and 30 carbon atoms, for example trioctyl phosphate. Mention may in particular be made, as examples of ester plasticizers, of the compounds selected from the group consisting of trimellitates, pyromellitates, phthalates, 1,2-cyclohexanedicarboxylates, adipates, azelates, sebacates, glycerol triesters and the mixtures of these compounds. Mention may in particular be made, among the above triesters, of glycerol triesters, preferably predominantly composed (for more than 50%, more preferably for more than 80% by weight) of an unsaturated $C_{18}$ fatty acid, that is to say selected from the group consisting of oleic acid, linoleic acid, linolenic acid and the mixtures of these acids. More preferably, whether it is of synthetic origin or natural origin (case, for example, of sunflower or rapeseed vegetable oils), the fatty acid used is composed for more than 50% by weight, more preferably still for more than 80% by weight, of oleic acid. Such triesters (trioleates) having a high content of oleic acid are well known; they have been described, for example in Application WO 02/088238, as plasticizing agents in tyre treads.

According to another preferred embodiment, the rubber composition of the invention can also comprise, as solid plasticizer (solid at 23° C.), a hydrocarbon resin exhibiting a Tg of greater than +20° C., preferably of greater than +30° C., such as described, for example, in Applications WO 2005/087859, WO 2006/061064 or WO 2007/017060.

Hydrocarbon resins are polymers well-known to a person skilled in the art which are essentially based on carbon and hydrogen and which are thus miscible by nature in diene elastomer compositions, when they are additionally described as "plasticizing". They can be aliphatic, aromatic or also of the aliphatic/aromatic type, that is to say based on aliphatic and/or aromatic monomers. They can be natural or synthetic, based or not based on petroleum (if such is the case, also known under the name of petroleum resins). They are preferably exclusively of hydrocarbon nature, that is to say that they comprise only carbon and hydrogen atoms.

Preferably, the plasticizing hydrocarbon resin exhibits at least one, more preferably all, of the following characteristics:
- a Tg of greater than 20° C. (more preferably between 40 and 100° C.);
- a number-average molecular weight (Mn) of between 400 and 2000 g/mol (more preferably between 500 and 1500 g/mol);
- a polydispersity index (PI) of less than 3, more preferably of less than 2 (as a reminder: PI=Mw/Mn with Mw the weight-average molecular weight).

The Tg of this resin is measured in a known way by DSC (Differential Scanning calorimetry) according to Standard ASTM D3418. The macrostructure (Mw, Mn and PI) of the hydrocarbon resin is determined by steric exclusion chromatography (SEC); solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

According to a particularly preferred embodiment, the plasticizing hydrocarbon resin is selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, α-methylstyrene homopolymer or copolymer resins and the mixtures of these resins. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinylaromatic copolymer resins, $C_9$ fraction/vinylaromatic copolymer resins and the mixtures of these resins.

The term "terpene" combines here, in a known way, α-pinene, β-pinene and limonene monomers; use is preferably made of a limonene monomer, which compound exists, in a known way, in the form of three possible isomers:

L-limonene (laevorotatory enantiomer), D-limonene (dextrorotatory enantiomer) or else dipentene, a racemate of the dextrorotatory and laevorotatory enantiomers. Suitable as vinylaromatic monomers are, for example: styrene, α-methylstyrene, ortho-, meta- or para-methylstyrene, vinyltoluene, para(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction). Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The content of hydrocarbon resin is preferably between 3 and 60 phr, more preferably between 3 and 40 phr, in particular between 5 and 30 phr.

In the case where it is desired to increase the stiffness of the tread once blown, without, however, reducing the content of liquid plasticizer above, reinforcing resins (e.g., methylene acceptors and donors), such as described, for example, in WO 02/10269 or U.S. Pat. No. 7,199,175, can advantageously be incorporated.

The heat-expandable rubber composition can also comprise coupling activators, when a coupling agent is used, agents for covering the inorganic filler, when an inorganic filler is used, or more generally processing aids capable, in a known way, by virtue of an improvement in the dispersion of the filler in the rubber matrix and of a lowering of the viscosity of the compositions, of improving their processability in the raw state; these agents are, for example, hydroxysilanes or hydrolysable silanes, such as alkylalkoxysilanes, polyols, polyethers, amines, or hydroxylated or hydrolysable polyorganosiloxanes.

4.5. Manufacture of the Compositions

The rubber compositions are manufactured in appropriate mixers, for example using three successive phases of preparation according to a general procedure known to a person skilled in the art: a first phase of thermomechanical working or kneading (sometimes referred to as "non-productive" phase) at high temperature, up to a maximum temperature of between 130° C. and 200° C., preferably between 145° C. and 185° C., followed by a second (non-productive) phase at lower temperature (preferably below 100° C.), during which the blowing agent is incorporated, and finally a third phase of mechanical working (sometimes referred to as "productive" phase) at low temperature, typically below 120° C., for example between 60° C. and 100° C., during which finishing phase the crosslinking or vulcanization system is incorporated.

A process which can be used for the manufacture of such rubber compositions comprises, for example and preferably, the following stages:

incorporating, in a mixer, at least the filler and the heat-fusible compound in the elastomer or in the mixture of elastomers, everything being kneaded thermomechanically, in one or more goes, until a maximum temperature of between 130° C. and 200° C. is reached;

cooling the combined mixture to a temperature of less than 100° C.;

then incorporating the blowing agent in the mixture thus obtained and cooled, everything being kneaded thermomechanically until a maximum temperature of less than 100° C. is reached;

subsequently incorporating a crosslinking system;

kneading everything up to a maximum temperature of less than 120° C.;

extruding or calendering the rubber composition thus obtained.

By way of example, all the necessary constituents, the optional supplementary covering agents or processing aids and various other additives, with the exception of the blowing agent and the crosslinking system, are introduced, during the first non-productive phase, into an appropriate mixer, such as an ordinary internal mixer. After thermomechanical working, dropping and cooling of the mixture thus obtained, a second (non-productive) phase of thermomechanical working is then carried out in the same internal mixer, during which phase the blowing agent is incorporated at a more moderate temperature (for example 60° C.), in order to obtain a maximum dropping temperature of less than 100° C. The crosslinking system is then incorporated, at low temperature, generally in an external mixer, such as an open mill; everything is then mixed (productive phase) for a few minutes, for example between 5 and 15 min.

The crosslinking system proper is preferably based on sulphur and on a primary vulcanization accelerator, in particular on an accelerator of the sulphenamide type. Additional to this vulcanization system are various known secondary vulcanization accelerators or vulcanization activators, such as zinc oxide, stearic acid, guanidine derivatives (in particular diphenylguanidine), and the like, incorporated during the first non-productive phase and/or during the productive phase. The sulphur content is preferably between 0.5 and 5 phr and the content of the primary accelerator is preferably between 0.5 and 8 phr.

Use may be made, as (primary or secondary) accelerator, of any compound capable of acting as accelerator for the vulcanization of diene elastomers in the presence of sulphur, in particular accelerators of the thiazole type, and also their derivatives, and accelerators of thiuram and zinc dithiocarbamate types. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC") and the mixtures of these compounds.

The final composition thus obtained is subsequently calendered, for example in the form of a sheet or plaque, in particular for laboratory characterization, or else calendered or extruded in the form of a heat-expandable tread.

In the raw state (i.e., non-vulcanized state) and thus non-expanded state, the density, denoted $D_1$, of the heat-expandable rubber composition is preferably between 1.100 and 1.400 g/cm³, more preferably within a range from 1.150 to 1.350 g/cm³.

The vulcanization (or curing) is carried out in a known way at a temperature generally of between 130° C. and 200° C., for a sufficient time which can vary, for example, between 5 and 90 min, as a function in particular of the curing temperature, of the vulcanization system adopted and of the kinetics of vulcanization of the composition under consideration.

It is during this vulcanization stage that the blowing agent will release a large amount of gas, to result in the formation of bubbles in the foam rubber composition and finally in its expansion.

In the cured state (i.e., vulcanized state), the density, denoted $D_2$, of the rubber composition once expanded (i.e., in the foam rubber state) is preferably between 0.500 and 1.000 g/cm³, more preferably within a range from 0.600 to 0.850 g/cm³.

Its degree of expansion by volume, denoted $T_E$ (expressed as %), is preferably between 30% and 150%, more preferably within a range from 50% to 120%, this degree of expansion $T_E$ being calculated in a known way from the above densities $D_1$ and $D_2$, as follows:

$$T_E=[(D_1/D_2)-1]\times 100.$$

Preferably, its Shore A hardness (measured in accordance with Standard ASTM D 2240-86) is within a range from 50 to 70.

5. EXAMPLES OF THE IMPLEMENTATION OF THE INVENTION

The heat-expandable rubber composition described above can advantageously be used in treads, at the very least for their portion which is intended to come directly into contact with the surface of the road, of tyres for any type of vehicle, in particular in tyres for passenger vehicles, as demonstrated in the tests which follow.

For the requirements of these tests, two rubber compositions (denoted C-0 and C-1) were prepared, the formulations of which are given in Table 1 (contents of the various products expressed in phr). The composition C-0 is the control composition. The composition C-1 is that in accordance with the invention, additionally comprising the blowing agent and the heat-fusible compound; its content of plasticizer (plasticizing resin) has been reduced with the objective of maintaining the stiffness after curing at a level equivalent to that of the control composition C-0 (targeted Shore A hardness equal to approximately 57).

The following procedure was used for the manufacture of these compositions: the reinforcing filler, the diene elastomer (SBR and BR blend), the heat-fusible compound (urea) for the C-1 composition and the various other ingredients, with the exception of the vulcanization system and the blowing agent, were successively introduced into an internal mixer, the initial vessel temperature of which was approximately 60° C.; the mixer was thus filled to approximately 70% (% by volume). Thermomechanical working (non-productive phase) was then carried out in a stage of approximately 2 to 4 min, until a maximum "dropping" temperature of approximately 150° C. was reached. The mixture thus obtained was subsequently cooled to a temperature below 100° C., the cold mixture was reintroduced into the same internal mixer (initial temperature 60° C.) and then, for the composition C-1, the blowing agent (diazo compound) was incorporated in the said mixture (mixture filled to approximately 70% by volume). A second thermomechanical working (non-productive phase) was then carried out in a stage of approximately 2 to 4 min, until a maximum dropping temperature of less than 100° C. was reached. The mixture thus obtained was recovered and cooled and then an accelerator of sulphonamide type and sulphur were incorporated on an external mixer (homofinisher) at 30° C., everything being mixed (productive phase) for a few minutes.

The compositions C-0 and C-1 thus prepared were subsequently used as treads of radial carcass passenger vehicle tyres, respectively denoted T-0 (control tyres) and T-1 (tyres in accordance with the invention), of dimensions 155/65 R14, conventionally manufactured and in all respects identical, apart from the constituent rubber compositions of their treads.

Table 2 shows the properties measured before and after curing: the tread of the tyre in accordance with the invention exhibits, after curing, once in the foam rubber state (i.e., expanded state), a markedly reduced density corresponding to a particularly high degree of expansion by volume of approximately 70%.

In order to subsequently characterize the noise reduction properties of the respective treads, a running test was carried out on the tyres in which the sound level emitted was evaluated by measuring the acoustic pressure level, during running of the vehicle at a speed of 60 km/h, by virtue of several microphones positioned inside the vehicle (road noise). The vehicle used was a vehicle of "Subaru" make ("R1" model); the surface of the roadway used for this test corresponds to a semi-rough asphalt; during passage through the measurement region, recording of the acoustic pressure is triggered.

The results in Table 3 express the difference in sound level recorded between, on the one hand, the tyre T-1 in accordance with the invention and the control tyre denoted T-0, within a frequency range from 300 to 1900 Hz. These differences are expressed in acoustic energy (dB(A)), which corresponds to the integration of the acoustic pressure as a function of the frequency over the frequency ranges under consideration, a negative value indicating a reduction in the noise with respect to the reference.

On reading Table 3, it is found that a reduction in noise which is entirely significant to a person skilled in the art is obtained on the tyre in accordance with the invention by virtue of the specific foam rubber composition constituting its tread.

TABLE 1

| | Composition No.: | |
|---|---|---|
| | C-0 | C-1 |
| SBR (1) | 70 | 70 |
| BR (2) | 30 | 30 |
| Silica (3) | 80 | 80 |
| Coupling agent (4) | 6.4 | 6.4 |
| Carbon black (5) | 5 | 5 |
| Blowing agent (6) | — | 10 |
| Heat-fusible compound (7) | — | 10 |
| Liquid plasticizer (8) | 15 | 15 |
| Plasticizing resin (9) | 20 | 10 |
| DPG (10) | 1.5 | 1.5 |
| ZnO | 1.2 | 1.2 |
| Stearic acid | 2 | 2 |
| Antiozone wax | 1.5 | 1.5 |
| Antioxidant (11) | 2 | 2 |
| Sulphur | 1.2 | 1.2 |
| Accelerator (12) | 1.8 | 1.8 |

(1) SBR with 26% of styrene units and 74% of butadiene units (21% of trans-1,4-, 21% of cis-1,4- and 58% of 1,2-); Tg = −25° C.;
(2) BR with 0.3% of 1,2-; 2.7% of trans; 97% of cis-1,4-(Tg = −104° C.);
(3) Silica, Ultrasil 7000 from Degussa, HDS type (BET and CTAB: approximately 160 m²/g);
(4) TESPT coupling agent (Si69 from Degussa);
(5) ASTM grade N234 (Cabot);
(6) Azodicarbonamide (Cellmic C-22 from Sankyo Kasei);
(7) Urea (Mitsui Chemical);
(8) MES oil (Catenex SNR from Shell);
(9) $C_5/C_9$ resin (Escorez ECR-373 from Exxon);
(10) Diphenylguanidine (Perkacit DPG from Flexsys);
(11) N-(1,3-Dimethylbutyl)-N-phenyl-para-phenylenediamine (Santoflex 6-PPD from Flexsys);
(12) N-Dicyclohexyl-2-benzothiazolesulphenamide (Santocure CBS from Flexsys).

TABLE 2

| | Composition tested: | |
|---|---|---|
| | C-0 | C-1 |
| Density before curing the tyre | 1.17 | 1.18 |
| Density after curing the tyre | 1.17 | 0.70 |
| Degree of expansion by volume (%) | 0 | 70 |

TABLE 3

| | Range (Hz) | | | |
|---|---|---|---|---|
| | 300-700 | 700-1100 | 1100-1500 | 1500-1900 |
| dB(A) (*) | −0.9 | −2.9 | −3.3 | −3.4 |

(*) difference between tyre of the invention and control tyre, inside the vehicle

The invention claimed is:

1. A tire comprising a tread having a radially outermost part which comes in direct contact with a surface of a road, wherein at least the radially outermost part of the tread which comes in direct contact with the surface of the road, in an unvulcanized state, comprises a heat-expandable rubber composition,
wherein the heat-expandable rubber composition includes:
50 to 100 phr of a copolymer based on styrene and butadiene;
0 to 50 phr of another diene elastomer;
a reinforcing filler comprising from 70 to 120 phr of a silica and from 1 to 10 phr of carbon black;
between 5 and 25 phr of a blowing agent; and
between 5 and 25 phr of a heat-fusible compound having a melting point between 70° C. and 150° C.,
wherein a total content of the blowing agent and the heat-fusible compound is greater than 15 phr, and
wherein the heat-fusible compound is urea or a heat-fusible urea derivative.

2. The tire according to claim 1, wherein the copolymer based on styrene and butadiene is selected from the group consisting of styrene/butadiene copolymers, styrene/butadiene/isoprene copolymers, and mixtures thereof.

3. The tire according to claim 2, wherein the copolymer based on styrene and butadiene is a styrene/butadiene copolymer.

4. The tire according to claim 1, wherein the copolymer based on styrene and butadiene exhibits a glass transition temperature that is greater than −40° C.

5. The tire according to claim 1, wherein the other diene elastomer is selected from the group consisting of natural rubber, synthetic polyisoprenes, polybutadienes, butadiene copolymers, isoprene copolymers, and mixtures thereof.

6. The tire according to claim 5, wherein the other diene elastomer is a polybutadiene having a content of cis-1,4-bonds of greater than 90%.

7. The tire according to claim 5, wherein the other diene elastomer is a natural rubber or a synthetic polyisoprene.

8. The tire according to claim 5, wherein the other diene elastomer is a polybutadiene in a mixture with a natural rubber or a synthetic polyisoprene.

9. The tire according to claim 1, wherein the heat expandable rubber composition includes a plasticizing agent that is a liquid at 20° C., the plasticizing agent being present at a content such that a ratio by weight of the reinforcing filler to the liquid plasticizing agent is greater than 2.0.

10. The tire according to claim 1, wherein the blowing agent is selected from the group consisting of azo, nitroso, hydrazine, carbazide, semicarbazide, tetrazole, carbonate, citrate compounds, and mixtures thereof.

11. The tire according to claim 10, wherein the blowing agent is selected from the group consisting of diazo, dinitroso, sulphonyl semicarbazide, and sulphonyl hydrazide compounds, and mixtures thereof.

12. The tire according to claim 11, wherein the blowing agent is an azodicarbonamide compound.

13. The tire according to claim 1, wherein the blowing agent is present at a content of between 8 and 20 phr.

14. The tire according to claim 1, wherein the heat-fusible compound is present at a content of between 8 and 20 phr.

15. The tire according to claim 1, wherein the total content of the blowing agent and the heat-fusible compound is greater than 20 phr.

16. The tire according to claim 1, wherein the melting point of the heat-fusible compound is between 100° C. and 150° C.

17. The tire according to claim 1, wherein a density of the rubber composition, in the unvulcanized state, is between 1.100 and 1.400 g/cm$^3$.

18. The tire according to claim 1, wherein the tire is cured to a vulcanized state in which the heat-expandable rubber composition is expanded to form a heat-expanded rubber composition.

19. The tire according to claim 18, wherein a density of the heat-expanded rubber composition is between 0.500 and 1.000 g/cm$^3$.

20. The tire according to claim 18, wherein a degree of expansion by volume of the heat-expanded rubber composition is between 30% and 150%.

* * * * *